(12) United States Patent
Huang

(10) Patent No.: US 8,297,990 B2
(45) Date of Patent: Oct. 30, 2012

(54) LEAKAGE PROTECTION OUTLET

(76) Inventor: Huadao Huang, Yueqing (CN)

( * ) Notice: Subject to any disclaimer, the term of this patent is extended or adjusted under 35 U.S.C. 154(b) by 0 days.

(21) Appl. No.: 13/194,989

(22) Filed: Jul. 31, 2011

(65) Prior Publication Data

US 2012/0081819 A1 Apr. 5, 2012

(30) Foreign Application Priority Data

Sep. 30, 2010 (CN) .......................... 2010 1 0299583

(51) Int. Cl.
*H01R 13/44* (2006.01)
(52) U.S. Cl. ........................................................ 439/140
(58) Field of Classification Search .......... 439/135–137, 439/140, 145
See application file for complete search history.

(56) References Cited

U.S. PATENT DOCUMENTS

| | | | | |
|---|---|---|---|---|
| 6,998,945 | B2 * | 2/2006 | Huang et al. .................... | 335/18 |
| 7,019,952 | B2 * | 3/2006 | Huang et al. .................... | 361/42 |
| 7,195,500 | B2 * | 3/2007 | Huang et al. .................... | 439/107 |
| 7,265,956 | B2 * | 9/2007 | Huang ............................. | 361/42 |
| 7,289,306 | B2 * | 10/2007 | Huang et al. .................... | 361/42 |
| 7,295,415 | B2 * | 11/2007 | Huang et al. .................... | 361/107 |
| 7,315,227 | B2 * | 1/2008 | Huang et al. ..................... | 335/6 |
| 7,317,600 | B2 * | 1/2008 | Huang et al. .................... | 361/42 |
| 7,411,766 | B1 * | 8/2008 | Huang et al. .................... | 361/42 |
| 7,455,538 | B2 * | 11/2008 | Germain ........................ | 439/137 |
| 7,538,993 | B2 * | 5/2009 | Huang et al. .................... | 361/42 |
| 7,576,959 | B2 * | 8/2009 | Huang et al. .................... | 361/42 |
| 7,633,726 | B2 * | 12/2009 | Huang et al. .................... | 361/42 |
| 7,645,148 | B2 * | 1/2010 | Carbone et al. ............... | 439/137 |
| 7,645,149 | B2 * | 1/2010 | Carbone et al. ............... | 439/137 |
| 7,833,030 | B1 * | 11/2010 | Huang ........................... | 439/137 |
| 7,859,368 | B2 * | 12/2010 | Huang et al. .................... | 335/18 |
| 7,883,346 | B2 * | 2/2011 | Huang ........................... | 439/140 |
| 7,887,346 | B1 * | 2/2011 | Huang ........................... | 439/140 |
| 7,934,935 | B1 * | 5/2011 | Gao ............................... | 439/137 |
| 7,985,085 | B2 * | 7/2011 | Gao ............................... | 439/137 |
| 8,007,296 | B2 * | 8/2011 | Chen et al. ..................... | 439/136 |
| 8,147,260 | B2 * | 4/2012 | Huang ........................... | 439/140 |
| 2006/0274463 | A1 * | 12/2006 | Huang et al. .................... | 361/42 |
| 2006/0279886 | A1 * | 12/2006 | Huang et al. .................... | 361/42 |
| 2007/0014068 | A1 * | 1/2007 | Huang et al. .................... | 361/115 |
| 2007/0049077 | A1 * | 3/2007 | Germain ........................ | 439/135 |
| 2009/0091869 | A1 * | 4/2009 | Huang et al. .................... | 361/42 |
| 2009/0227130 | A1 * | 9/2009 | Carbone et al. ............... | 439/137 |
| 2010/0073178 | A1 * | 3/2010 | Huang et al. .................... | 340/664 |
| 2010/0159722 | A1 * | 6/2010 | Chen ............................. | 439/137 |
| 2010/0317207 | A1 * | 12/2010 | Huang ........................... | 439/137 |
| 2010/0317209 | A1 * | 12/2010 | Huang ........................... | 439/140 |
| 2011/0092085 | A1 * | 4/2011 | Gao ............................... | 439/137 |

(Continued)

*Primary Examiner* — Ross Gushi
(74) *Attorney, Agent, or Firm* — Mei & Mark LLP

(57) ABSTRACT

A leakage protection outlet includes an upper cover with jacks, an intermediate bracket, a base, a power input end, a power output end, pairs of conductive plug bushes, baffles, a baffle locking mechanism, a reset button including a reset button extension arm, a reset mechanism, and an electromagnetic tripping mechanism. The baffle locking mechanism includes a lock latch, a lock latch keeper, and a reset spring. The reset button is linked to the reset mechanism and is configured to connect the power input and output ends together when pressed. The electromagnetic tripping mechanism is configured to disconnect the power input end from the power output end in response to a leakage current. The pairs of conductive plug bushes correspond to the jacks. The baffles are positioned between the pairs of conductive plug bushes and the jacks. The lock latch rests upon the baffles and the reset button extension arm.

16 Claims, 6 Drawing Sheets

U.S. PATENT DOCUMENTS

| | | | |
|---|---|---|---|
| 2011/0092086 A1* | 4/2011 | Gao | 439/137 |
| 2011/0104918 A1* | 5/2011 | Chen et al. | 439/136 |
| 2011/0211283 A1* | 9/2011 | Huang et al. | 361/42 |
| 2011/0273803 A1* | 11/2011 | Huang | 361/42 |
| 2011/0273813 A1* | 11/2011 | Huang | 361/170 |
| 2012/0081819 A1* | 4/2012 | Huang | 361/42 |
| 2012/0083142 A1* | 4/2012 | Huang | 439/135 |
| 2012/0149221 A1* | 6/2012 | Huang | 439/137 |
| 2012/0170159 A1* | 7/2012 | Huang | 361/42 |
| 2012/0187958 A1* | 7/2012 | Huang | 324/557 |

* cited by examiner

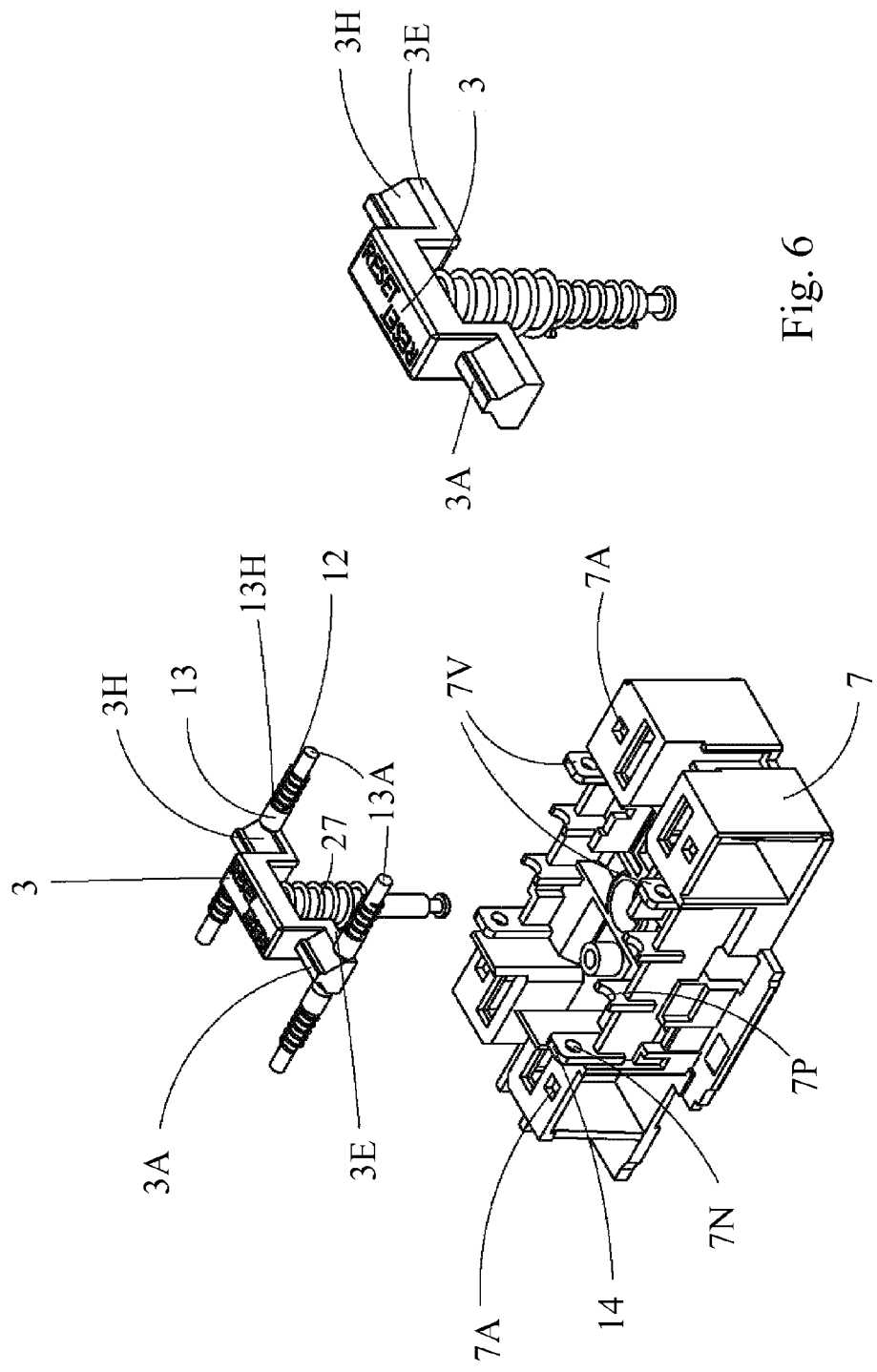

LEAKAGE PROTECTION OUTLET

CLAIM FOR PRIORITY

This application claims priority under 35 U.S.C. §119 to Chinese patent application No. 201010299583.4 filed Sep. 30, 2010, the content of which is incorporated herein by reference in its entirety.

TECHNICAL FIELD

The present invention relates generally to a leakage protection outlet. The leakage protection outlet has mechanical counter-wiring protection functions.

BACKGROUND

Existing leakage protection outlets normally include an upper cover with jacks, an intermediate bracket, a base, a power input end, a power output end, a reset button provided on the upper cover, a reset mechanism for connecting the power input end and the power output end when the reset button is pressed, an electromagnetic tripping mechanism for disconnecting the power input end and the power output end when leakage current appears, etc. A pair of conductors leading from the power output end is provided with at least one pair of conductive plug bushes, which correspond to the positions of the jacks on the upper cover. This pair of conductors is also provided with a pair of static contacts. A pair of conductors leading from the power input end is provided with a pair of moving contacts. When the reset button is pressed, it resets correctly and ejects up, driving the moving contacts to lift up and to connect with the static contacts. The conductive plug bushes are electrified. For the specific structure and movement process, refer to the Chinese utility model patent application No. 01226819.4. The problems existing with this type of leakage protection outlet include: If the power supply wire is connected to the power output end mistakenly during installation, the power will make the conductive plug bushes electrified directly at all times instead of through the internal mechanism. In this case, leakage protection cannot be achieved.

Some existing leakage protection outlets are provided with baffles to protect the conductive plug bushes. It normally includes a base connected securely to the intermediate bracket and two baffle units that are spliced alternately and can slide on the base. A spring is provided between the baffle units. When a plug is inserted into the baffles, the two baffle units are staggered, uncovering the conductive plug bushes below them. When the plug is pulled out, the baffle units, under the action of the spring, cover the conductive plug bushes. However, this type of leakage protection outlet does not have the function of protection against mistaken wiring.

SUMMARY

Considering the above limitations of existing technology, this leakage protection outlet aims to prevent a plug from being inserted into the conductive plug bushes in the case of mistaken wiring.

Thus, I propose a leakage protection outlet comprising an upper cover with at least one jack, an intermediate bracket, a base, a power input end, a power output end, at least one pair of conductive plug bushes, at least one baffle, a baffle locking mechanism, a reset button including a reset button extension arm, a reset mechanism, and an electromagnetic tripping mechanism. The baffle locking mechanism includes a lock latch, a lock latch keeper, and a reset spring.

The reset button is linked to the reset mechanism and is configured to connect the power input end and the power output end together when the reset button is pressed. The electromagnetic tripping mechanism is configured to disconnect the power input end from the power output end in response to a leakage current. The at least one pair of conductive plug bushes correspond to the at least one jack of the upper cover. The at least one baffle is positioned between the at least one pair of conductive plug bushes and the at least one jack. The lock latch comprises a first end and a second end which rest upon the baffle and the reset button extension arm respectively.

BRIEF DESCRIPTION OF THE DRAWINGS

The accompanying drawings, which are incorporated in and constitute a part of this specification, illustrate several embodiments and together with the description, serve to explain the principles of the leakage detection protective circuit.

FIG. 5 is a detailed view of the baffle locking mechanism of Embodiment 1.

FIG. 6 is a view of the reset button of Embodiment 1.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

Figure 1:
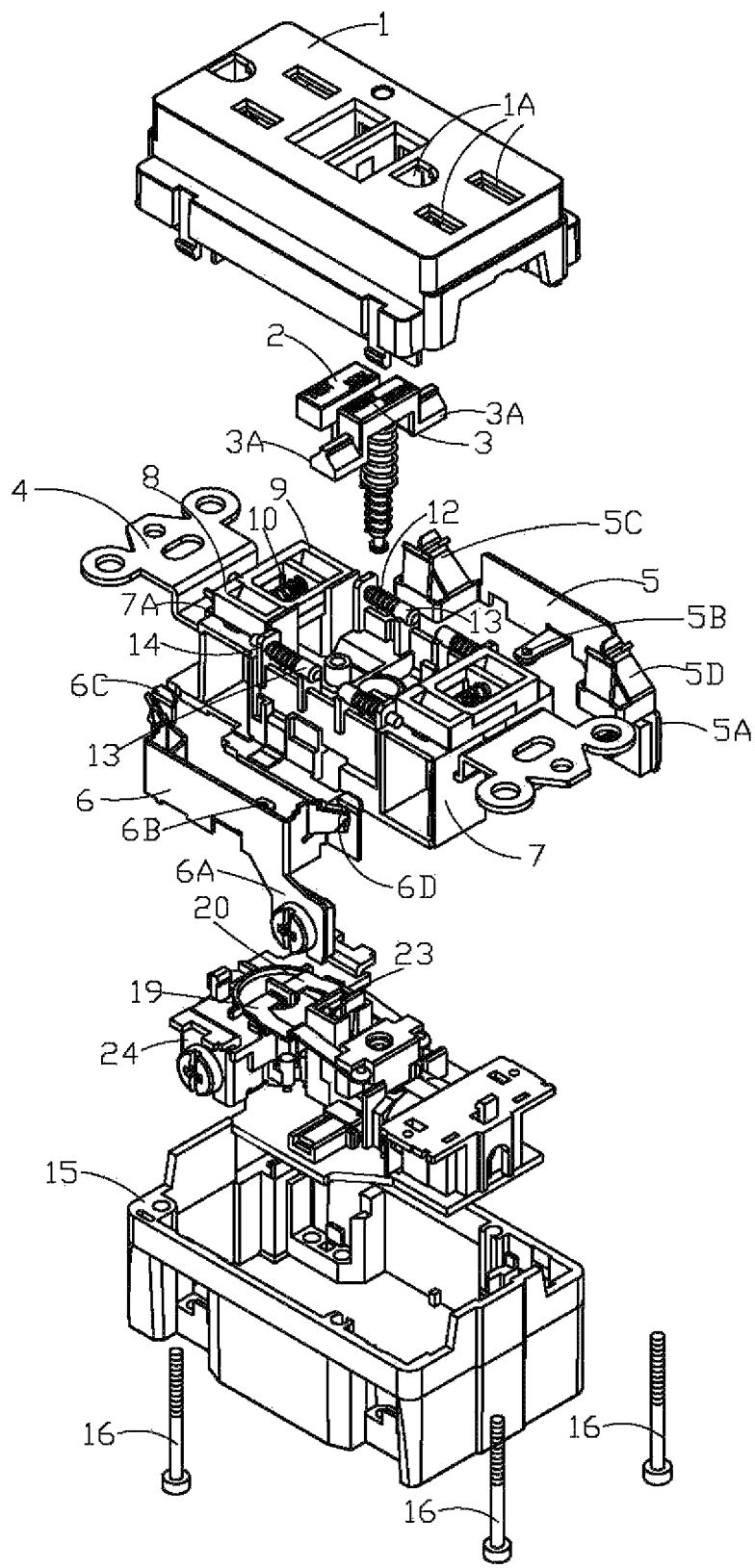
FIG. 1 is an expanded view of Embodiment 1 of this leakage protection outlet.
Figure 4:
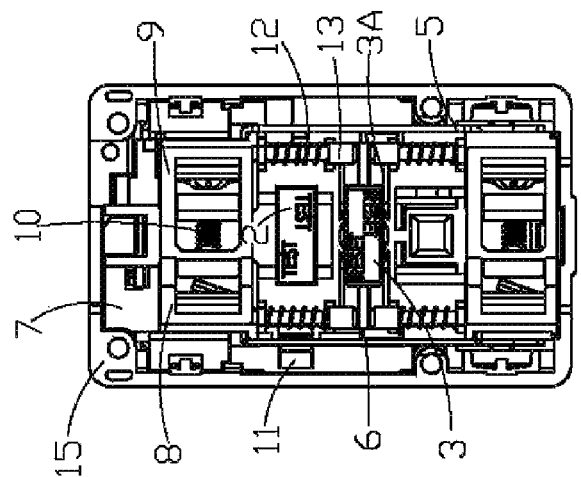
FIG. 4 is a structural representation of Embodiment 1 of this leakage protection outlet in a baffle-unlocked state.
Figure 3:
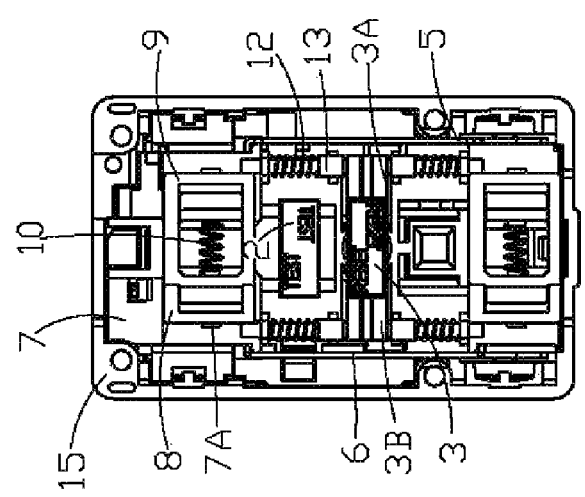
FIG. 3 is a structural representation of Embodiment 1 of this leakage protection outlet in a baffle-locked state.
Figure 2:
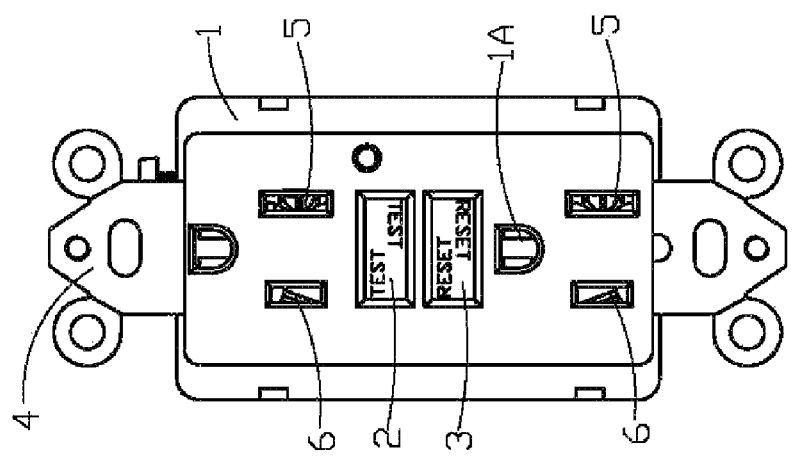
FIG. 2 is a front view of Embodiment 1 of this leakage protection outlet.
Figure 7:
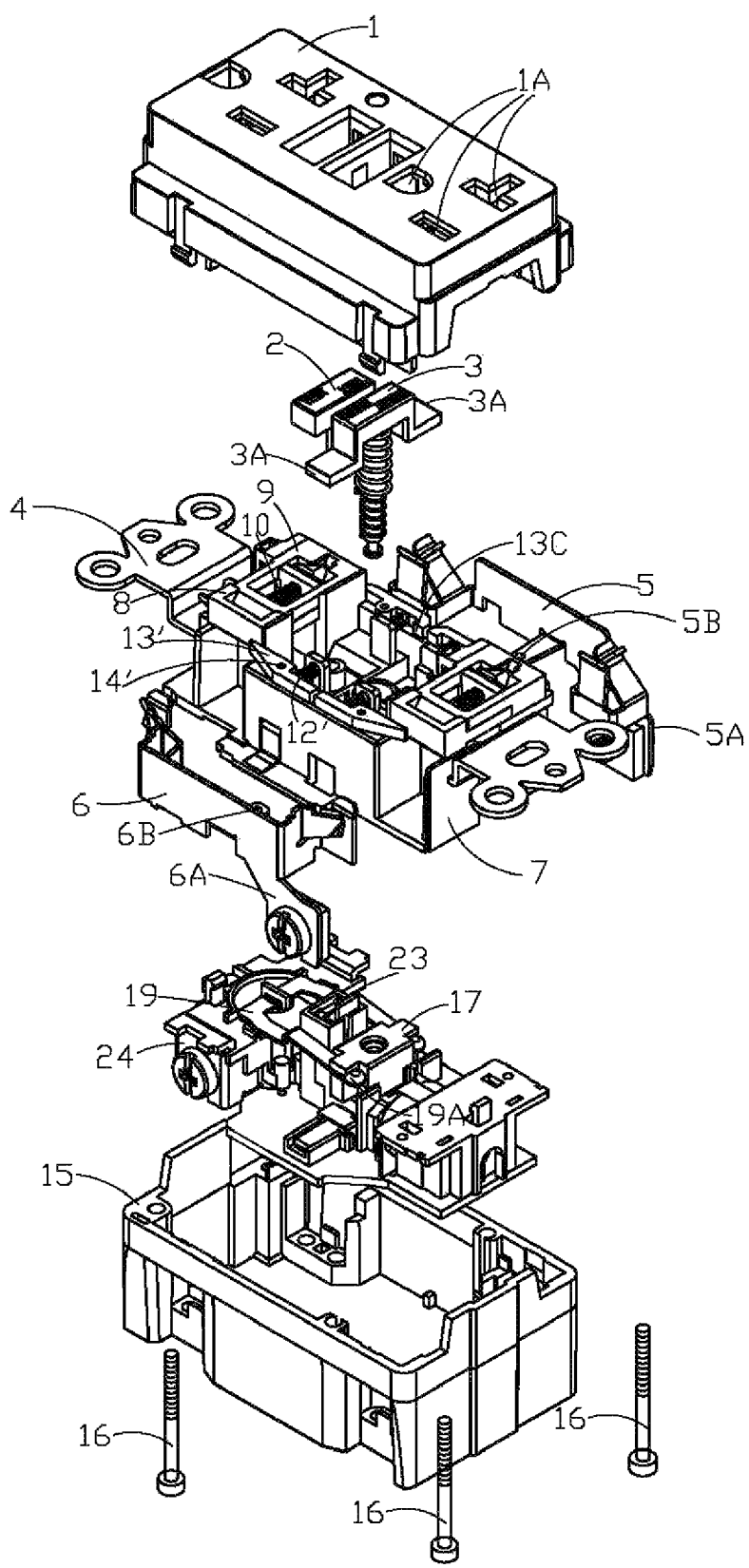
FIG. 7 is an expanded view of Embodiment 2 of this leakage protection outlet.

Embodiment 1 of this leakage protection outlet will now be described in detail with reference to FIGS. 1-6. As shown in FIGS. 1, 2 & 3, the leakage protection outlet includes upper cover 1 with jacks 1A, intermediate bracket 7, base 15, power input ends 24 & 23, power output ends 6A and 5A, reset button 3 provided on upper cover 1, reset mechanism for connecting the power input end and power output end when reset button 3 is pressed, and the electromagnetic tripping mechanism for disconnecting the power input end and power output end when leakage current appears. As they are not related to the improvement points of this leakage protection outlet, no detailed description is given to various structures such as connection bolt 16, test button 2, the reset mechanism, the electromagnetic tripping mechanism and moving sheet metals 19 & 20 that are linked with reset button 3.

A pair of conductors 6 & 5 leading from the power output end is provided with a pair of static contacts 6B & 5B and at least one pair of conductive plug bushes. In this embodiment, two pairs of conductive plug bushes 6C, 6D, 5C & 5D are provided. Correspondingly, two groups of jacks are provided on upper cover 1 (straight live wire jacks corresponding to a pair of output conductors, straight neutral wire jacks, and a U-shaped grounding wire jack). The conductive plug bushes correspond to the positions of the jacks on the upper cover.

Above conductive plug bush 6A, a baffle is provided, which is composed of left baffle unit 8, right baffle unit 9 and spring 10. Intermediate bracket 7 is provided with a baffle locking mechanism which is linked with reset button 3. The baffle locking mechanism of this embodiment includes lock latch 13, lock latch keeper 14 and reset spring 12. The two end of lock latch 13 rest on the baffle and the reset button extension arm 3A respectively.

The figures show that this embodiment has two groups of baffles, including 4 baffle units and 4 groups of locking mechanism are provided. In the following, one group of locking mechanism is taken for instance to explain its structure and action process. The lock latch keeper 14 of this embodiment is a supporting piece secured on the intermediate bracket 7 and has a guide hole 7N or support groove 7P on it. Lock latch 13 is pulled through the guide hole 7N or support groove 7P of the supporting piece. A spring positioning stair 13H is provided on lock latch 13. Setting spring 12 is covered on lock latch 13, with its two ends pushing against the spring positioning stair 13H and the inner side of the supporting piece respectively. For the structure of supporter 14, it can be a combination of two supporting pieces with guide holes 7N, or a combination of one supporting piece with a guide hole 7N and one supporting piece with a semicircular support groove 7P, or otherwise a combination of two supporting pieces with semicircular support grooves 7P. For the combination of two supporting pieces with semicircular support grooves 7P, a caging device is provided on the upper cover to prevent the lock latch from separating out of the support grooves 7P. If it is possible, a press plate with a semicircular groove can be provided to match the semicircular support groove 7P on the support piece. An example of the positions of the guide holes 7N and support grooves 7P is shown in FIG. 5.

Reset button extension arm 3A has a locking face 3E which pushes against the lock latch 13 when the trip mechanism ejects up, an unlocking face 3H which pushes against the lock latch 13 when the reset is pressed, and a transition slope face that connects the locking face and the unlocking face. A view of the reset button 3 and extension arm 3A can be seen in FIGS. 5 and 6.

Similar to the existing baffle structure, baffle 8 of this embodiment includes two baffle units that are spliced alternately. Spring 10 is provided between the baffle units. Unlike the existing baffle, the baffle of this leakage protection outlet has a support leg under each baffle unit. On intermediate bracket 7, support leg positioning holes 7A are made, with their width slightly larger than that of the support legs. When the support legs of the baffle units reach the two outer sides of positioning holes 7A respectively, the plug insertion position on the baffle has its opening width equal to the width of the plug pieces. When the baffle plugs the jacks 1A on the upper cover, the two baffle support legs push against the inner side of the support leg positioning hole.

To prevent the baffle from misaligning with jack holes 1A on the upper cover, intermediate bracket 7 is provided with guide rail that cooperates with the baffle for the baffle to slide in the fixed direction. The guide rail can be of multiple structural forms. For assembly convenience and cost saving, the guide rail includes two vertical panels 7V that are provided in parallel with the baffle movement direction. The baffle is provided within the space between the two vertical panels 7V. These vertical panels 7V can e seen in FIG. 5. The existing intermediate bracket is of frame structure in the baffle installation position, and so the baffle needs base. In this embodiment, the intermediate bracket has an integrated platform at the baffle installation position. The platform has baffle positioning holes 7A. The two vertical panels 7V that form the baffle guide rail are located in the two sides of the positioning holes.

The action process of this leakage protection outlet is as follows: For the initial status in the case of correction wring, the conductive plug bushes are not electrified and the baffle plugs the conductive plug bushes, as shown in FIG. 3. When reset button 3 is pressed, the locking face 3E of reset button extension arm 3A lowers and separates from lock latch 13. Under the action of reset spring 12, lock latch 13 moves toward the reset button through the transition slope face. When it arrives at the position where the unlocking face 3H of reset button extension arm 3A pushes against the lock latch, the other end of the lock latch separates from baffles 8 & 9 and the baffles are unlocked. See FIG. 4. At this time, when a plug is inserted, the baffles can be opened and the plug can contact with the conductive plug bushes. In the case of mistaken wiring, i.e. the power wire is connected directly to the power output end, when reset button 3 is pressed down, the reset button cannot reset successfully because no current flows through the internal leakage protection mechanism. The reset button along with the extension arm lifts up under the action of its own reset spring. (A guide column is provided below the reset button, and a reset spring is covered around the guide column.) Lock latch 13 moves through the transition slope face and pushes against the locking face 3E automatically. The baffle remains in the locked state. At this time, the conductive plug bushes are plugged by the baffles and so the plug cannot be inserted, eliminating the potential safety hazard caused by mistaken wiring.

Embodiment 2 of this leakage protection outlet will now be described in detail with reference to FIGS. 7-12. The differences between this embodiment and Embodiment 1 are as follows: The live wire holes and neutral wire holes in Embodiment 1 are both straight shaped; while in this embodiment, the live wire holes are straight shaped and the neutral wire holes are T shaped. In this embodiment, lock latch keeper 14' is a spindle secured on the intermediate bracket. Lock latch 13' is hinged to the spindle, and pushing type reset spring 12' is connected to the side close to reset button extension arm 3A. A reset spring positioning piece is provided on intermediate bracket 7. A positioning groove is made on the spring positioning piece. Lock latch 13' is provided with a spring guide column. One end of spring 12' pushes in the positioning groove of the spring positioning piece. Hooks can also be provided on the spring positioning piece and lock latch. The reset spring is hooked on the two hooks or bulges.

Figure 10:
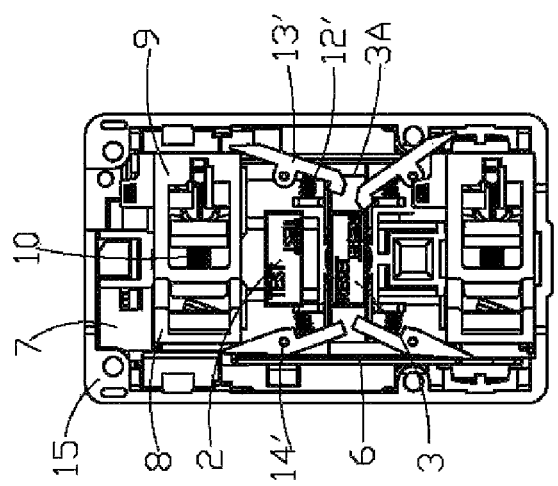
FIG. 10 is a structural representation of Embodiment 2 of this leakage protection outlet in a baffle-unlocked state.
Figure 9:
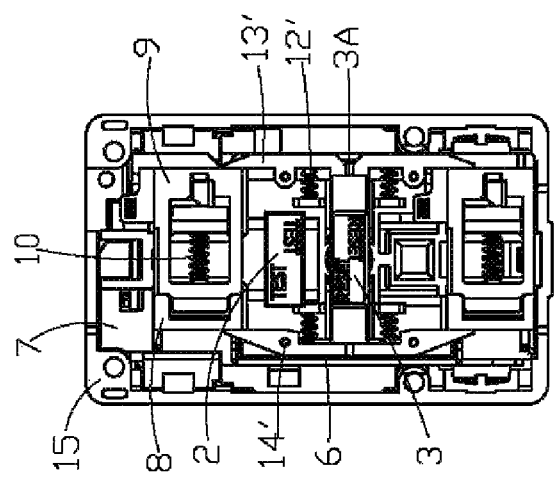
FIG. 9 is a structural representation of Embodiment 2 of this leakage protection outlet in a baffle-locked state.
Figure 8:
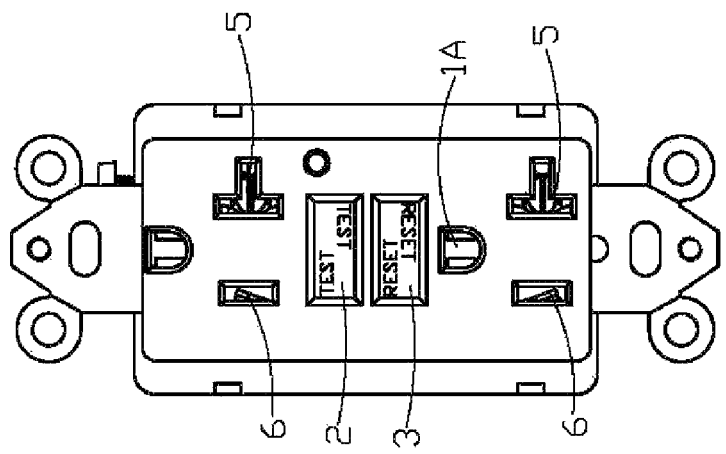
FIG. 8 is a front view of Embodiment 2 of this leakage protection outlet.
Figure 12:
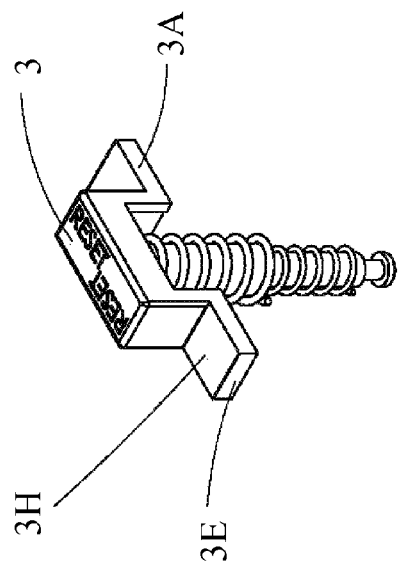
FIG. 12 is a view of the reset button of Embodiment 1.
Figure 11:
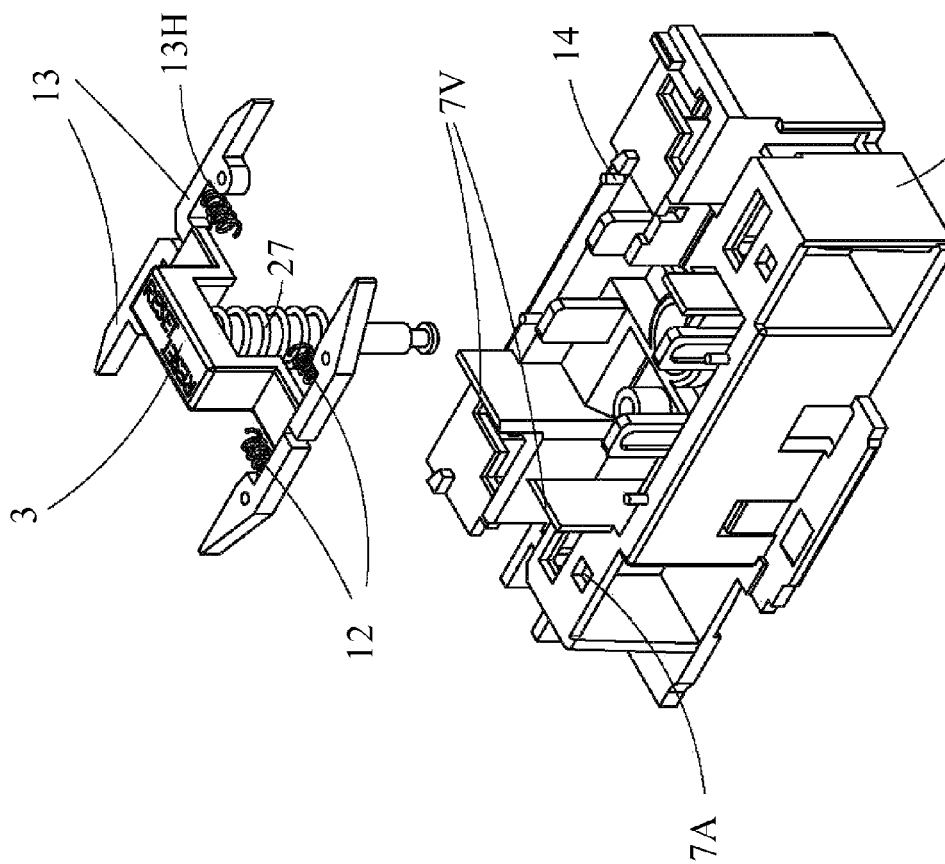
FIG. 11 is a detailed view of the baffle locking mechanism of Embodiment 1.

Refer to FIGS. 9 & 10. When reset button 3 is pressed, the lock latch remains perpendicular to the baffle. When the baffle is opened by the plug, the lock latch rotates along the spindle under the action of the baffle, compressing the pushing type reset spring. When the baffle resets, the lock latch rotates to the position perpendicular to the lock latch under the action of the pushing type reset spring. After the reset button ejects up, its extension arm pushes against the lock latch and locks the baffle automatically. Lock latch 13' is wedge-shaped at the end with which it rests against baffles 8 & 9. The wedge-shaped end has a slant face that bends from the end that rests against the reset button extension arm towards the inside.

Between this slant face and the inner wall of upper cover 1, a space is formed for the wedge-shaped end of the lock latch to rotate along the spindle. This avoids impediment to the baffle unlocking due to the small clearance between the inner wall of the upper cover and the lock latch.

The beneficial effect of this leakage protection outlet is mainly as follows: Through the cooperation of the lock mechanism and baffles, it can prevent the baffles from opening in the case of mistaken wiring, eliminating the potential safety hazard caused by mistaken wiring. The structure of the lock mechanism is simple, and its action is reliable. The baffles insert into the positioning holes of the intermediate bracket through the underneath support legs for positioning. It uses the plane of the intermediate bracket as the baffle platform, eliminating the baffle base. This results in convenience of assembly and saving of cost.

Although the foregoing invention has been described in detail by way of illustration and example for purposes of clarity of understanding, it will be readily apparent to those of ordinary skill in the art in light of the description herein that certain changes and modifications may be made thereto without departing from the spirit or scope of the appended claims. It is also to be understood that the terminology used herein is for the purpose of describing particular aspects only, and is not intended to be limiting, since the scope of the present invention will be limited only by the appended claims.

In the preceding specification, various preferred embodiments have been described with reference to the accompanying drawings. It will, however, be evident that various other modifications and changes may be made thereto, and additional embodiments may be implemented, without departing from the broader scope of the claims that follow. The specification and drawings are accordingly to be regarded in an illustrative rather than restrictive sense.

I claim:

1. A leakage protection outlet comprising:
    an upper cover comprising at least one jack;
    an intermediate bracket;
    a base;
    a power input end;
    a power output end;
    at least one pair of conductive plug bushes;
    at least one baffle;
    a baffle locking mechanism comprising:
        a lock latch;
        a lock latch keeper; and
        a reset spring;
    a reset button comprising a reset button extension arm;
    a reset mechanism; and
    an electromagnetic tripping mechanism;
    wherein:
    the reset button is linked to the reset mechanism and is configured to connect the power input end and the power output end together when the reset button is pressed,
    the electromagnetic tripping mechanism is configured to disconnect the power input end from the power output end when a leakage current occurs,
    the at least one pair of conductive plug bushes correspond to the at least one jack of the upper cover,
    the at least one baffle is positioned between the at least one pair of conductive plug bushes and the at least one jack, and
    the lock latch comprises a first end and a second end which rest upon the baffle and the reset button extension arm respectively.

2. The leakage protection outlet of claim 1 wherein:
    the lock latch keeper is secured to the intermediate bracket and further comprises a guide hole configured to support the lock latch,
    the lock latch is positioned within the guide hole of the lock latch keeper,
    the lock latch comprises a spring positioning stair,
    the reset spring of the baffle locking mechanism covers the lock latch and presses against the spring positioning stair and the latch keeper,
    the reset button extension arm further comprises a locking face, an unlocking face, and a transition slope between the locking face and the unlocking face,
    the locking face of the reset button extension arm is configured to push against the lock latch when the electromagnetic tripping mechanism has disconnected the power input end and the power output end, and
    the unlocking face of the reset button extension arm is configured to push against the lock latch when the reset button is pressed.

3. The leakage protection outlet of claim 2 wherein:
    the guide hole of the lock latch keeper is a support groove.

4. The leakage protection outlet of claim 1 wherein:
    the reset button extension arm further comprises a locking face, an unlocking face, and a transition slope between the locking face and the unlocking face,
    the locking face of the reset button extension arm is configured to push against the lock latch when the electromagnetic tripping mechanism has disconnected the power input end and the power output end, and
    the unlocking face of the reset button extension arm is configured to push against the lock latch when the reset button is pressed.

5. The leakage protection outlet of claim 1 wherein:
    the lock latch keeper comprises a spindle secured to the intermediate bracket,
    the lock latch is hinged to the spindle of the lock latch keeper, and
    the reset spring of the baffle locking mechanism comprises a pushing type spring connected to a side of the lock latch in proximity with the reset button extension arm.

6. The leakage protection outlet of claim 5 wherein:
    the first end of the lock latch comprises a wedge shape, and the wedge shape of the first end of the lock latch is configured so that a space is formed between the wedge shape and an inner wall of the leakage protection outlet that allows the lock latch to rotate.

7. The leakage protection outlet of claim 1 wherein:
    the at least one baffle comprises two baffle units and a reset spring,
    the two baffle units are spliced alternately,
    each of the baffle units further comprise a support leg,
    the intermediate bracket further comprises support leg positioning holes with diameters slightly larger than the diameters of the support legs of the baffle units, and
    the support legs of the baffle units are configured so that when the at least one baffle plugs the at least one jack of the upper cover, the support legs push against an inner side of the support leg positioning holes.

8. The leakage protection outlet of claim 1 wherein:
    the intermediate bracket further comprises guide rails that interact with the at least one baffle to ensure that the at least one baffle slides in a fixed direction.

9. The leakage protection outlet of claims 8 wherein:
    the guide rails of the intermediate bracket comprise vertical panels that are arranged in parallel with an intended direction of baffle movement, and the at least one baffle is provided within a space between the vertical panels of the guide rails.

10. The leakage protection outlet of claims 9 wherein:
the intermediate bracket further comprises an integrated platform at a baffle installation position,
the integrated platform of the intermediate bracket comprises baffle positioning holes, and
the vertical panels of intermediate bracket are positioned within two sides of the positioning holes.

11. An outlet protection device comprising:
at least one baffle;
a baffle locking mechanism comprising:
   a lock latch;
   a lock latch keeper; and
   a reset spring; and
a reset button comprising a reset button extension arm;
wherein:
the lock latch comprises a first end which rests upon the baffle and a second end that rests upon the reset button extension arm.

12. The outlet protection device of claim 11 wherein:
the lock latch keeper further comprises a guide hole configured to support the lock latch,
the lock latch is positioned within the guide hole of the lock latch keeper,
the lock latch comprises a spring positioning stair,
the reset spring of the baffle locking mechanism covers the lock latch and presses against the spring positioning stair and the latch keeper.

13. The outlet protection device of claim 11 wherein:
the reset button extension arm further comprises a locking face, an unlocking face, and a transition slope between the locking face and the unlocking face,
the locking face of the reset button extension arm is configured to push against the lock latch when an electromagnetic tripping mechanism has disconnected a power input end and a power output end of an outlet, and
the unlocking face of the reset button extension arm is configured to push against the lock latch when the reset button is pressed.

14. The outlet protection device of claim 11 wherein:
the lock latch keeper comprises a spindle secured to the intermediate bracket,
the lock latch is hinged to the spindle of the lock latch keeper, and
the reset spring of the baffle locking mechanism comprises a pushing type spring connected to a side of the lock latch in proximity with the reset button extension arm.

15. The outlet protection device of claim 11 wherein:
the at least one baffle comprises two baffle units and a reset spring,
the two baffle units are spliced alternately,
each of the baffle units further comprise a support leg.

16. An reset button for an outlet device comprising:
a spring actuated arm;
a pressable button area perpendicular to the spring actuated arm; and
a reset button extension arm perpendicular to the spring actuated arm, the reset button extension arm comprising a locking face, an unlocking face, and a transition slope between the locking face and the unlocking face.

* * * * *